(12) United States Patent
Kobayashi et al.

(10) Patent No.: US 7,046,311 B2
(45) Date of Patent: May 16, 2006

(54) PHOTO-WRITING TYPE RECORDING MEDIUM AND MANUFACTURING METHOD THEREFOR

(75) Inventors: Hideo Kobayashi, Ebina (JP); Takehito Hikichi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 844 days.

(21) Appl. No.: 10/093,602

(22) Filed: Mar. 11, 2002

(65) Prior Publication Data

US 2003/0012916 A1 Jan. 16, 2003

(30) Foreign Application Priority Data

Jun. 20, 2001 (JP) ............................. 2001-187374

(51) Int. Cl.
*G02F 1/13* (2006.01)
(52) U.S. Cl. ............................................ 349/2; 430/55
(58) Field of Classification Search ............... 349/2; 430/55, 58.05
See application file for complete search history.

(56) References Cited

U.S. PATENT DOCUMENTS

| 5,800,950 | A | * | 9/1998 | Hirao et al. ................... 430/1 |
| 5,932,384 | A | * | 8/1999 | Mitsumori et al. ......... 430/58.8 |
| 6,589,445 | B1 | * | 7/2003 | Sugiyama et al. ..... 252/299.01 |
| 6,600,473 | B1 | * | 7/2003 | Kobayashi et al. ........... 345/97 |
| 2001/0031412 | A1 | * | 10/2001 | Itami et al. ............... 430/58.15 |

FOREIGN PATENT DOCUMENTS

| JP | 05188615 | * | 7/1993 |
| JP | 06011873 | * | 1/1994 |
| JP | A 2000-180888 | | 6/2000 |
| JP | 2000-286055 | * | 10/2000 |

OTHER PUBLICATIONS

"Liquid crystal space modulator and data processing", Liquid crystal, vol. 2, No. 1, 1998, pp. 3-9.
H. KamiyamaO et al., "Research for Elgraphy", Japan Hardcopy '96 Fall Meeting, pp. 25-28 (abstract on p. 25).
Fukushima et al., "Ferroelectric liquid-crystal spatial light modulator achieving bipolar image operation and cascadability", Applied Optics, vol. 31, No. 32, pp. 6859-6868, Nov. 10, 1992.
Yoshida et al., "A4.1: Reflective Display with Photoconductive Layer and a Bistable, Reflective Cholesteric Mixture", SID 96 Applications Digest, pp. 59-62.

* cited by examiner

*Primary Examiner*—Toan Ton
(74) *Attorney, Agent, or Firm*—Oliff & Berridge, PLC

(57) ABSTRACT

An a.c. driving system photo-writing type recording medium having a substrate formed an electrode layer on one side thereof, a transparent substrate formed a transparent electrode layer on one side thereof, an optical switching layer having a pair of charge generation layers each including a charge generation material; and a charge transport layer including a charge transport material, disposed between the pair of charge generation layers, and a display element layer, in which the electrode layer of the substrate and the transparent electrode layer of the transparent substrate are opposed to each other, and the following equation (1) is satisfied $$|Ipcgl - Ipctl| \leq 0.5 \text{ eV} \tag{1}$$

where Ipcgl is an ionization potential of the charge generation material and Ipctl is an ionization potential of the charge transport material.

11 Claims, 4 Drawing Sheets

LIGHT

PHOTO-WRITING TYPE RECORDING MEDIUM AND MANUFACTURING METHOD THEREFOR

BACKGROUND OF THE INVENTION

1. Field of the Invention

The present invention relates to a photo-writing type recording medium usable as a so-called electronic paper is written an image with light, can retain the image thus written, and is deleted the image as necessary so that another image can be written therein and a manufacturing method therefor.

2. Description of the Related Art

In recent years, a photo-writing type space modulation device having a photo-conductive switching element and a display element in combination has been developed and put to practical use in projector, etc. as a lightbulb, and its applicability to the art of optical data processing has been studied as described in "Liquid crystal space modulator and data processing", Liquid crystal, vol. 2, No. 1, 1998, pp. 3–18.

While a predetermined voltage is being applied to the display element, the photo-writing type space modulation device changes the impedance of the photo-conductive switching element according to an amount of light received and controls the voltage applied to the display element to drive the display element so that an image is displayed thereon. In particular, a separable photo-writing type recording medium, which is a photo-writing type space modulation device employing an a display controlling element having memory properties, has attracted attention as an electronic paper medium.

As display controlling elements (display elements) for photo-writing type recording medium there have been studied liquid crystal display elements such as nematic liquid crystal which has been dispersed in a polymer to have memory properties, cholesteric liquid crystal and ferroelectric liquid crystal, electrophoretic element, electric field rotation element, toner electric field transfer element, materials obtained by encapsulating these elements, etc.

As optical switching elements capable of controlling voltage or current according to the amount of light received, there have been studied, e.g., amorphous silicon element for use in the art of electrophotography, OPC element having a function-separating type two-layers structure having an organic photo-conductor, etc. Further, the inventors have studied an OPC element comprising a charge generation layer (CGL) formed on the upper and lower sides of a charge transport layer (CTL) (hereinafter referred to as "dual CGL structure"). In particular, an OPC element requires no high temperature heat treatment and thus is the OPC element advantageous in that it can be applied to a flexible substrate such as PET film. Further, the OPC element requires no vacuum process and thus is advantages in that the OPC element can be manufactured at a low cost.

Among the foregoing structures, the dual CGL structure can be driven by an a.c. voltage. Even when a liquid crystal element is used as a display element, the bias component contained in the voltage applied prevents the displayed image from being burn-in due to the transfer of ion. Thus, the dual CGL structure is a very useful structure. The carrier to be used for driving may be either positive or negative.

FIG. 1 illustrates a schematic sectional view of an optical switching element having the dual CGL structure. FIG. 1 shows the state of carrier and electron generated when the optical switching element is irradiated with light. The optical switching element of FIG. 1 has an upper charge generation layer 10, a charge transport layer 12, a lower charge generation layer 14, a transparent electrode layer 18, and an electrode layer 16 sequentially laminated on the surface of a transparent substrate 19.

When the optical switching element is irradiated with light, carrier c and free electron e are generated in the upper charge generation layer 10 and the lower charge generation layer 14. If this occurs while the optical switching element is under the application of an electric field such that the electrode layer 16 is a positive electrode and the transparent electrode layer 18 is a positive electrode, carrier c generated in the upper charge generation layer 10 is injected into the charge transport layer 12 while free electron e rushes into the transparent electrode layer 18. The carrier c which has been transported combines with the free electron e generated in the lower charge generation layer 14 while the carrier c generated in the lower charge generation layer 14 is injected into the electrode layer 16. As a result, an electric current flows. When the electric field is inverted, a direction of electric current is also inverted. Accordingly, the optical switching element having such a structure can be driven by the application of an a.c. voltage.

FIG. 2 is a conceptual diagram of a photo-writing type recording medium in which an optical switching element having such a dual CGL structure is applied to an electronic paper. While FIG. 2 shows a photo-writing type recording medium having a d.c. component-removing film, such a d.c. component-removing film is not an essential constituent. The photo-writing type recording medium in FIG. 2 has integrally an optical switching element having a transparent substrate 19, a transparent electrode layer 18a, a lower charge generation layer 14, a charge transport layer 12 and an upper charge generation layer 10; a d.c. component-removing film provided as a functional layer 20 on the optical switching element; and a liquid crystal display element having a spacer 24, a liquid crystal 22, a transparent electrode layer 18b and a transparent substrate 19 provided on the functional layer 20. In operation, an a.c. voltage is applied between the transparent electrode layers 18a and 18b. In general, light represented by an arrow performs photo-writing.

By electrically connecting the foregoing photo-writing type recording medium having integrally the optical switching element and a functional element to a driving mechanism for driving such a photo-writing type recording medium, a device having various functions can be produced. Further, the driving mechanism is structured to be separable from the photo-writing type recording medium, the photo-writing type recording medium can be separated from the main body of the device so that the photo-writing type recording medium can be subjected to circulation or distribution.

However, the dual CGL structure is disadvantageous in that the dual CGL structure has an insufficient photosensitivity. For example, in the case where as a charge generation material there is used perylene, the dual CGL structure needs a light amount as great as several milliwatts per $cm^2$ to make positive recording (irradiated area shows a high reflectance while unirradiated area shows a low reflectance) for forming a monochromatic image as described in JP-A-2000-180888.

The term "photosensitivity" as used herein means that when the optical switching element is irradiated with a predetermined amount of light or when the optical switching element is applied a predetermined voltage, the optical switching element shows a reduced resisitivity component in the impedance thereof. The predetermined volume of light is normally in a range of from about 50 μW/cm² to about 500 μW/cm², or about 1 mW/cm² when the optical switching element is irradiated large amount of light. The predetermined voltage is normally in a range of from about 50 $V_{OP}$ to about 500 $V_{OP}$. An OPC element exhibits an impedance resistivity as very high as in a range of from several hundreds of megaohm per cm² to several gigaohm per cm² in darkness but exhibits an impedance resistivity in a range of from hundreds of kiloohm per cm² to scores of megaohmper cm2. On the other hand, a display element normally exhibits an impedance resistivity of from several megaohm per cm² to about 100 MΩ per cm². Therefore, as the resistive component decreases more upon the irradiation with light, this decreasing makes greater contribution to enhancement of recording sensitivity or expansion of recording margin.

Therefore, an aim of the invention is to solve the problems of the foregoing photo-writing type recording medium having a dual CGL structure in the related art. In other words, an aim of the invention is to provide a photo-writing type recording medium with a dual CGL structure having a high photosensitivity. Another aim of the invention is to provide a manufacturing method for manufacturing a photo-writing type recording medium with a dual CGL structure having a high photosensitivity.

In the art of ordinary electrophotography, 1) efficiency of generation of carrier and 2) efficiency of injection of carrier is essential for the enhancement of sensitivity to light. The dual CGL structure must meet further requirement for 3) efficiency of release of carrier to a charge transport layer. In other words, the dual CGL structure is arranged such that carrier generated in the charge generation layer rushes into the charge transport layer from which the carrier is then released into the charge generation layer. Accordingly, the dual CGL structure must be arranged such that carrier can be easily injected from the charge generation layer into the charge transport layer as well as can be easily released from the charge transport layer to the charge generation layer.

The foregoing performances are requirements peculiar to the dual CGL structure and is different from required performances of the function-separating type two-layers structure in the electrophotographic photoreceptor. In the case of selection of charge generation layer and charge transport layer for the function-separating type two-layers structure in the electrophotographic photoreceptor, it is effective to design the ionization potential of the charge generation material greater as much as possible than that of the charge transport material so that charge generated in the charge generation layer can be efficiently injected into the charge transport layer, i.e., the efficiency of injection of charge can be enhanced.

In the case that a CTL (carrier transport layer) is hole transfer type, since hole moves on HOMO in CGL and CTL, a barrier layer is formed when |HOMOcgl|−|HOMOctl| is smaller than 0 from the standpoint of energy level as shown in FIG. 3. Therefore, it is necessary that |HOMOcgl|−|HOMOctl| be greater than 0. Accordingly, in order to give a higher efficiency of injection, it is an important design guidance that this difference is positive and great. As shown in FIG. 3, this energy level corresponds to ionization potential. Further, since this ionization potential can be measured, materials can be selected and designed in view of ionization potential.

On the other hand, the dual CGL structure is arranged such that charge which has been injected from the charge generation layer into the charge transport layer is then released to the other charge generation layer. Further, in the case where the dual CGL structure is driven by an a.c. voltage, the release of carrier from the charge generation layer to the charge transport layer and the re-release of carrier from the charge transport layer to the charge generation layer occur in the same charge generation layer. Therefore, in the case where |HOMOcgl|>>|HOMOctl| (the symbol ">>" means that the former is extremely greater than the latter), no barrier layer is formed when carrier rushes into the charge transport layer but a barrier layer is formed when carrier then rushes into the charge generation layer. Accordingly, in the dual CGL structure, it is difficult to enhance transport efficiency. Therefore, the dual CGL structure is disadvantageous in that it cannot exhibit a sufficiently lowered resistivity when irradiated with light. As a result, it is required that large amount of light is irradiated or the recording margin is reduced. This is a problem.

SUMMARY OF THE INVENTION

In order to solve these problems, the inventors made studies on a relationship between the charge transport layer and the charge generation layer in an optical switching element having a dual CGL structure, particularly a material having a high charge generation efficiency and a charge transport material which can efficiently receive and release charge produced by the charge generation material. As a result, it was found that a definition of the relationship between the ionization potential of the two materials makes it possible to enhance the photosensitivity of the optical switching element. The present invention has thus been worked out. The invention may include the following construction and method.

<1> An a.c. driving system photo-writing type recording medium has a substrate formed an electrode layer on one side thereof; a transparent substrate formed a transparent electrode layer on one side thereof; an optical switching layer having a pair of charge generation layers each including a charge generation material and a charge transport layer including a charge transport material, disposed between the pair of charge generation layers; and a display element layer, in which the electrode layer of the substrate and the transparent electrode layer of the transparent substrate are opposed to each other and the following equation (1) is satisfied $$|Ipcgl - Ipctl| \leq 0.5 \text{ eV} \quad (1)$$

where Ipcgl is an ionization potential of the charge generation material; and Ipctl is an ionization potential of the charge transport material.

<2> In the photo-writing type recording medium according to clause <1>, the charge generation material has at least one of chlorogallium phthalocyanine, hydroxygallium phthalocyanine, and titanylophthalocyanine.

<3> In the photo-writing type recording medium according to clause <1>, the charge generation material has hydroxygallium phthalocyanine having a strong diffraction peak in Bragg angle (2θ±0.2°) of X-ray diffraction spectrum at one of the following i) to vi), that is:
  i) 7.5°, 9.9°, 12.5°, 16.3°, 18.6°, 25.1° and 28.3°;
  ii) 7.7°, 16.5°, 25.1° and 26.6°;
  iii) 7.9°, 16.5°, 24.4° and 27.6°;
  iv) 7.0°, 7.5°, 10.5°, 11.7°, 12.7°, 17.3°, 18.1°, 24.5°, 26.2° and 27.1°;
  v) 6.8°, 12.8°, 15.8° and 26.0°; and
  vi) 7.4°, 9.9°, 25.0°, 26.2°and 28.2°.

<4> In the photo-writing type recording medium according to clause <1>, the charge generation material has chlorogallium phthalocyanine having a strong diffraction peak in Bragg angle (2θ±0.2°) of X-ray diffraction spectrum at one of the following a) to c), that is:

a) 7.4°, 16.6°, 25.5° and 28.3°;
b) 6.8°, 17.3°, 23.6° and 26.9°; and
c) 8.7° to 9.2°, 17.6°, 24.0°, 27.4° and 28.8°.

<5> In the photo-writing type recording medium according to clause <1>, the charge generation material has titanyl phthalocyanine having a strong diffraction peak in Bragg angle (2θ±0.2°) of X-ray diffraction spectrum at 9.5°, 9.7°, 11.7°, 15.0°, 23.5°, 24.1°and 27.3°.

<6> In the photo-writing type recording medium according to any one of clauses <1> to <5>, the charge transport material comprises one of a benzidine-based compound and triphenylamine-based compound.

<7> In the photo-writing type recording medium according to any one of clauses <1> to <6>, the display element layer has memory property.

<8> In the photo-writing type recording medium according to any one of clauses <1> to <7>, the display element layer is a cholesteric liquid crystal display element layer.

<9> In the photo-writing type recording medium according to any one of clauses <1> to <7>, the display element layer is a cholesteric liquid crystal display element layer.

<10> A manufacturing method for manufacturing an a.c. driving system photo-writing type recording medium, the method has the steps of forming an optical switching layer on an electrode side surface of a substrate on which an electrode is formed, forming a display element layer on a transparent electrode side surface of a transparent substrate on which a transparent electrode is formed; and laminating an optical switching layer side surface of the substrate and a display element layer side surface of the transparent substrate with each other, in which in the optical switching layer forming step, a first charge generation layer having a charge generation material, a charge transport layer having charge transport material, and a second charge generation layer having the charge generation material are layered subsequently and in which in the layering step, the charge generation material and the charge transportation material are selected to satisfy the following equation (1), that is, $$|Ipcgl-Ipctl| \leq 0.5 \text{ eV} \tag{1}$$

where Ipcgl is an ionization potential of the charge generation material; and Ipctl is an ionization potential of the charge transport material.

<11> A manufacturing method for manufacturing an a.c. driving system photo-writing type recording medium, the method has the steps of forming an optical switching layer on a transparent electrode side surface of a transparent substrate on which a transparent electrode is formed, forming a display element layer on an electrode side surface of a substrate on which an electrode is formed; and laminating an optical switching layer side surface of the substrate and a display element layer side surface of the transparent substrate with each other, in which in the optical switching layer forming step, a first charge generation layer having a charge generation material, a charge transport layer having charge transport material, and a second charge generation layer having the charge generation material are layered subsequently and in which in the layering step, the charge generation material and the charge transportation material are selected to satisfy the following equation (1), that is, $$|Ipcgl-Ipctl| \leq 0.5 \text{ eV} \tag{1}$$

where Ipcgl is an ionization potential of the charge generation material; and Ipctl is an ionization potential of the charge transport material.

DETAILED DESCRIPTION OF THE PREFERRED EMBODIMENTS

Figure 1:
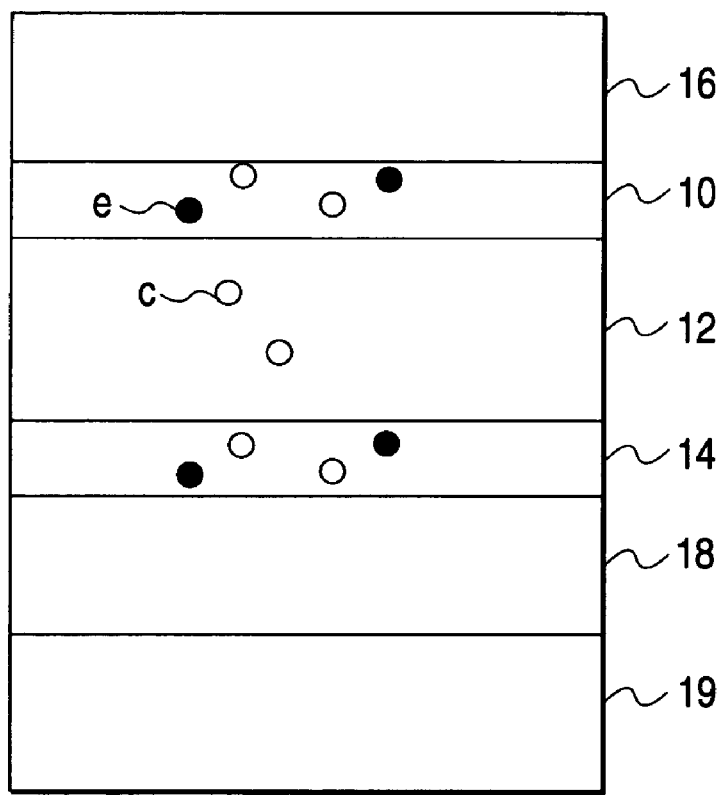
FIG. 1 is a schematic sectional view of an optical switching element having a dual CGL structure.
Figure 1:
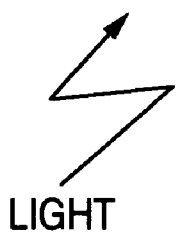
Figure 2:
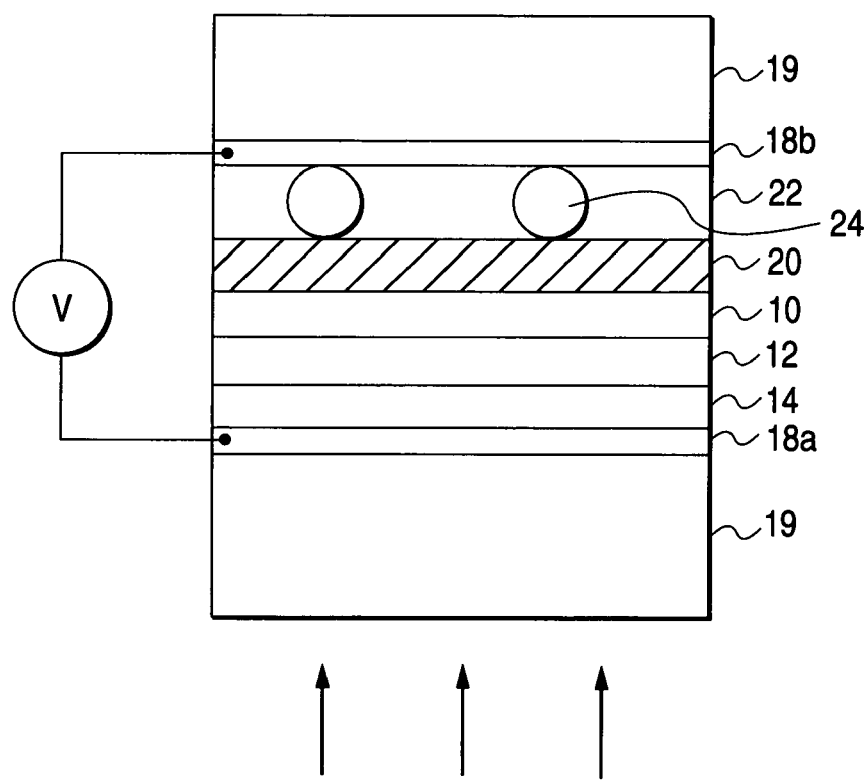
FIG. 2 is a diagram illustrating the concept of a photon-writing type recording medium comprising an optical switching element having a dual CGL structure applied to an electronic paper.

The invention will be further described hereinafter.

<Photo-writing Type Recording Medium>

An a.c. driving system photo-writing type recording medium according to the invention has a substrate formed an electrode layer on one side thereof; a transparent substrate formed a transparent electrode layer on one side thereof; an optical switching layer having a pair of charge generation layers each including a charge generation material and a charge transport layer including a charge transport material, disposed between the pair of charge generation layers; and a display element layer, in which the electrode layer of the substrate and the transparent electrode layer of the transparent substrate are opposed to each other and the following equation (1) is satisfied $$|Ipcgl-Ipctl| \leq 0.5 \text{ eV} \tag{1}$$

where Ipcgl is an ionization potential of the charge generation material; and Ipctl is an ionization potential of the charge transport material.

The photo-writing type recording medium of the invention may has other various layers in addition to the foregoing essential layers.

The photo-writing type recording medium of the invention will be further described hereinafter in connection with the various constituent elements.

a) Optical Switching Layer

In the invention, the optical switching layer has a pair of charge generation layers containing a charge generation material and a charge transport layer. The charge transport layer is disposed between the pair of charge generation layers. The charge generation material and the charge transport material satisfy the following equation:

$$|Ipcgl-Ipctl| \leq 0.5 \text{ eV} \tag{1}$$

where Ipcgl is the ionization potential of the charge generation material and Ipctl is the ionization potential of the charge transport material.

By selecting a combination of a charge generation material and a charge transport material satisfying the foregoing equation (1), a photo-writing type recording medium having a high sensitivity and a wide margin can be obtained. The fact that the left side of the foregoing relationship (1) is an absolute value means that the ionization potential of the charge transport material may be either higher or lower than that of the charge generation material. In other words, it has been concluded important that the absolute value of the difference in ionization potential between the charge generation material and the charge transport material is small to a.c. drive the photo-writing type recording according to the invention.

When (Ipcgl−Ipctl) is greater than 0.5 eV, a carrier can be injected into the charge transport layer but can be hardly released. The charge tends to be accumulated in the charge transport layer. On the other hand, when (Ipcgl−Ipctl) is smaller than −0.5 eV, a carrier can hardly be injected into the charge transport layer. This makes it difficult to lower the resistivity of the charge transport layer when irradiated with light. Therefore, it is the key of the invention that the difference between Ipcgl and Ipctl is not greater than 0.5 eV regardless of the sign of (Ipcgl−Ipctl)

The value of |Ipcgl−Ipctl| is preferably not greater than 0.4 eV, more preferably not greater than 0.3 eV, even more preferably not greater than 0.2 eV, particularly not greater than 0.1 eV.

For the measurement of the specific value of ionization potential, an atmosphere type ultraviolet ray opto-electronic analyzer (AC-1, produced by RIKEN KEIKI CO., LTD.) may be used. The ionization potential of the charge transport material CGM and that of the charge transport material is actually synonymous with the ionization potential of the charge generation layer and that of the charge transport layer.

Examples of the charge generation material employable herein include metal phthalocyanine, metal-free phthalocyanine, squarylium compound, azlenium compound, perylene pigment, indigo pigment, bisazo pigment, trisazo pigment, quinacridone pigment, pyrolopyrrole dye, polycyclic quinone pigment, condensed ring aromatic pigment, cyanine dye, xanthene pigment, charge transfer complex such as polyvinyl carbazole and nitrofluorene, and eutectic complex having a pyrilium salt dye and a polycarbonate resin.

The charge generation material to be used in the invention preferably has, as a main component, at least one compound selected from the group consisting of phthalocyanines having the following structural formula (I), i.e., chlorogallium phthalocyanine, hydroxygallium phthalocyanine, and titanylophthalocyanine:

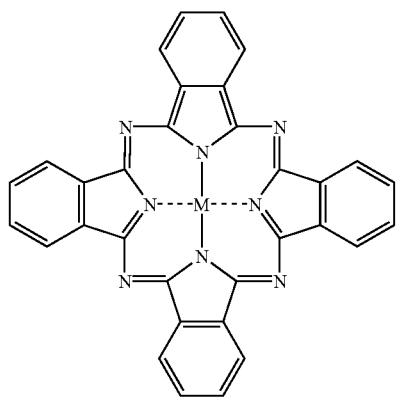

Structural formula (I)

M - GaOH
GaCl
TiO

The term "main component" indicates a component which accounts for not smaller than 50% of a subject material (here, compound constituting the charge generation material), preferably not smaller than 80% of that, more preferably not smaller than 90% of that. This definition can apply to other subject materials.

As the hydroxygallium phthalocyanine employable herein, one having a strong diffraction peak in Bragg angle (2θ±0.2°) of X-ray diffraction spectrum at one of the following i) to vi) is particularly preferred because such hydroxygallium phthalocyanine has a high charge generation efficiency. The ionization potential of these charge generation materials is about −5.3 eV (the sign "−" will be omitted hereinafter).

i) 7.5°, 9.9°, 12.5°, 16.3°, 18.6°, 25.1° and 28.3°;
ii) 7.7°, 16.5°, 25.1° and 26.6°;
iii) 7.9°, 16.5°, 24.4° and 27.6°;
iv) 7.0°, 7.5°, 10.5°, 11.7°, 12.7°, 17.3°, 18.1°, 24.5°, 26.2° and 27.1°;
V) 6.8°, 12.8°, 15.8° and 26.0°; and
vi) 7.4°, 9.9°, 25.0°, 26.2° and 28.2°.

As the chlorogallium phthalocyanine employable herein, one having a strong diffraction peak in Bragg angle (2θ±0.2°) of X-ray diffraction spectrum at one of the following a) to c) is particularly preferred because such chlorogallium phthalocyanine has a high charge generation efficiency. The ionization potential of these charge generation materials is about 5.4 eV.

a) 7.4°, 16.6°, 25.5° and 28.3°;
b) 6.8°, 17.3°, 23.6° and 26.9°; and
c) 8.7° to 9.2°, 17.6°, 24.0°, 27.4° and 28.8°.

As the titanyl phthalocyanine employable herein, one a strong diffraction peak in Bragg angle (2θ±0.2°) of X-ray diffraction spectrum at 9.5°, 9.7°, 11.7°, 15.0°, 23.5°, 24.1° and 27.3° is particularly preferred. Because such titanyl phthalocyanine has a high charge generation efficiency. The ionization potential of these charge generation materials is about 5.4 eV.

These charge generation materials have a high charge generation efficiency per amount of light and thus are high sensitivity charge generation materials.

In other words, by combining a proper combination of ionization potentials with a high sensitivity charge generation material, a charge generation material having a high charge generation efficiency per amount of light can be formed. This charge generation material can be used to generate charge, efficiently inject charge and efficiently release charge. Thus, a photo-writing type recording medium with a dual CGL structure having a high sensitivity and a wide margin can be manufactured.

Of course, a metal-free phthalocyanine (ionization potential: approxmately 5.2 eV) can be used as a charge generation material. Further, azo compounds exemplified below (azo-A to azo-C) can be used as charge generation materials.

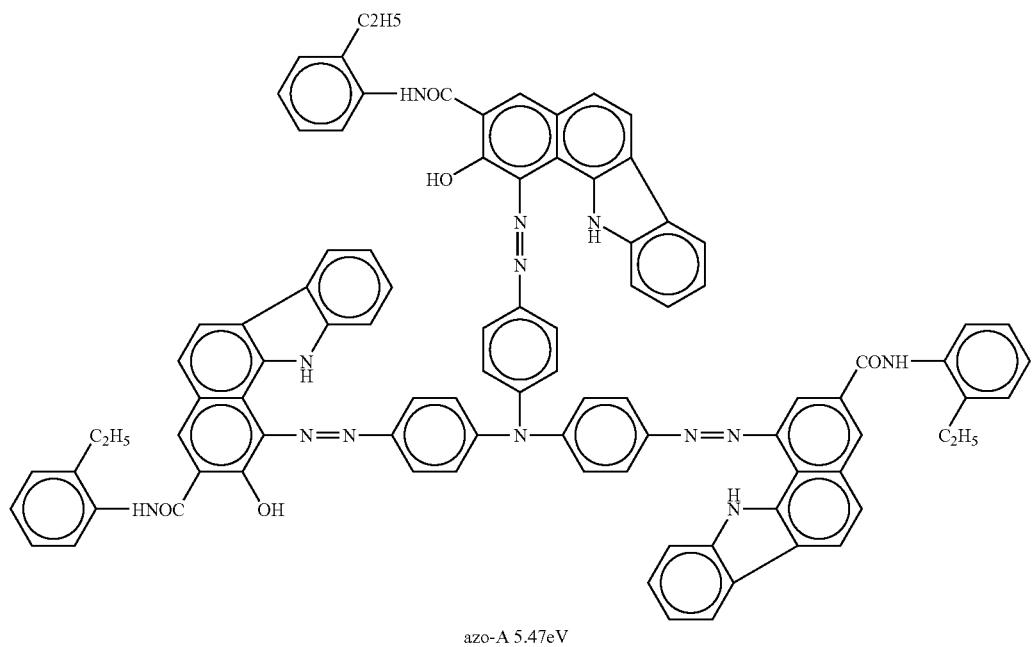

azo-A 5.47eV

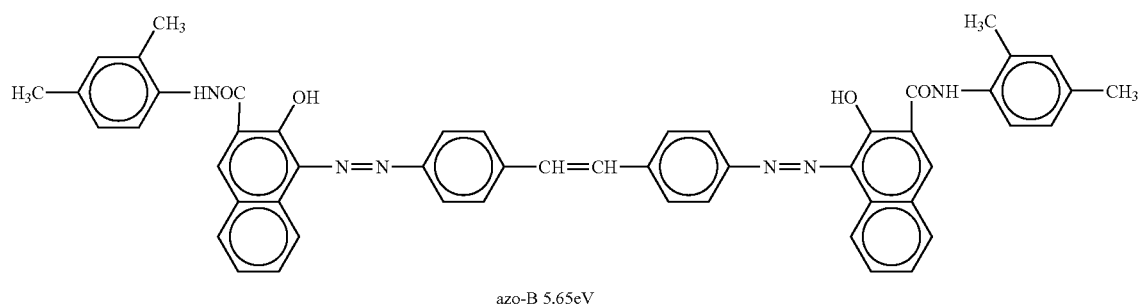

azo-B 5.65eV

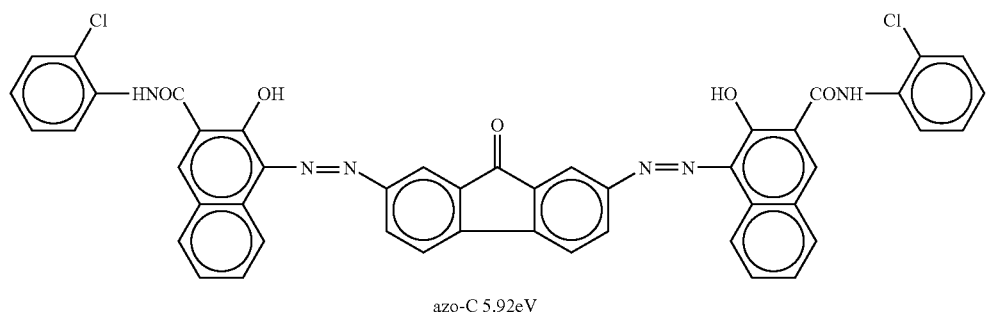

azo-C 5.92eV

The ionization potential of these compounds are in a range of from about 5.4 eV to about 5.9 eV. The figure attached to the foregoing chemical formulae each indicate the ionization potential of the compound (hereinafter, the same applies to other chemical formulae).

Other compounds which can be used as charge generation material such as perylene pigment will be exemplified below.

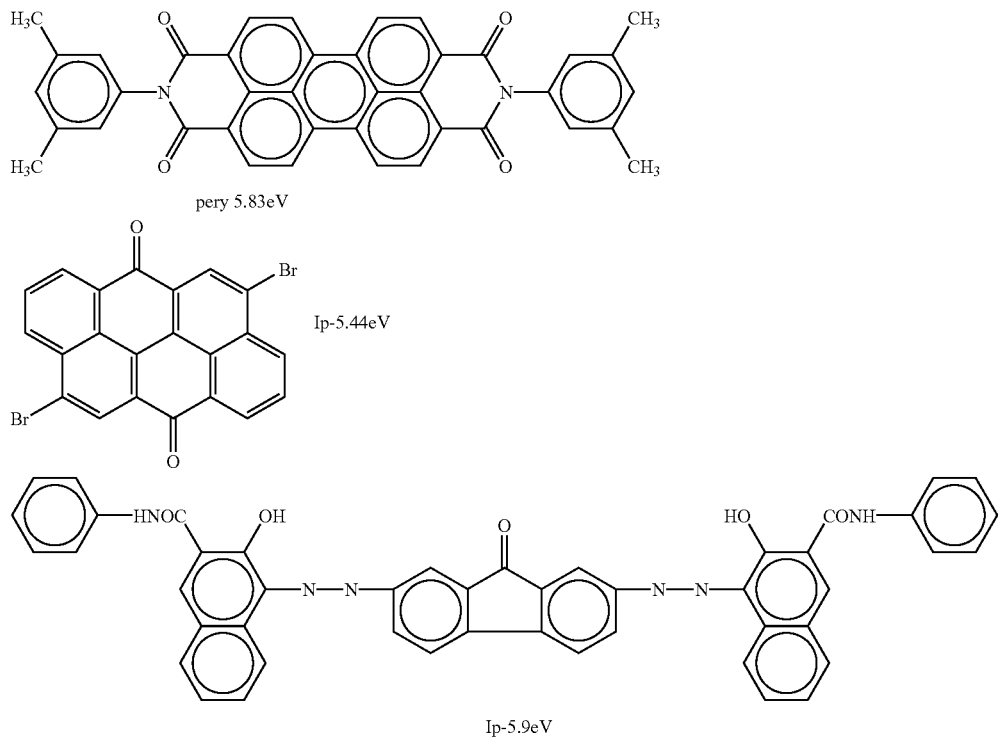

As the charge transport material to be used in the invention, there may be used a material having the ionization potential in a range of from 4.8 eV to 5.8 eV when hydroxygallium phthalocyanine is used as charge generation material. If a halogenated gallium phthalocyanine is used as charge generation material, a material having the ionization potential in a range of from 4.9 eV to 5.9 eV may be used. If titanylophthalocyanine is used as charge generation material, a material having the ionization potential in a range of from 4.9 eV to 5.9 eV may be used.

Specific examples of the charge transport material employable herein include positive hole transport materials such as trinitrofluorene-based compound, polyvinylcarbazole-based compound, oxadiazole-based compound, hydrazone-based compound (e.g., benzylamino-based hydrazone, quinoline-based hydrazone), stilbene-based compound, triphenylamine-based compound, triphenylmethane-based compound, and benzidine-based compound, and electron transport materials such as quinone-based compound, tetracyanoquinodimethane-based compound, furfleone compound, xanthone-based compound and benzophenone-based compound.

Preferred among these charge transport materials employable herein are those comprising as main component a benzidine-based compound and/or triphenylamine-based compound.

Particularly useful examples of positive charge transport material include hydrazone-based compounds having the following structural formulae (Compound 1-A to Compound 1-G), styryltriphenylamine compounds having the following structural formulae (Compound 2-A to Compound 2-K), N,N,N',N'-tetraphenylbenzidine compounds having the following structural formulae (Compound 3-A to Compound 3-H), triphenylamine compounds having the following structural formulae (Compound 4-A to Compound 4-E), and compounds having the following structural formulae (Compound 5-A to Compound 5-F).

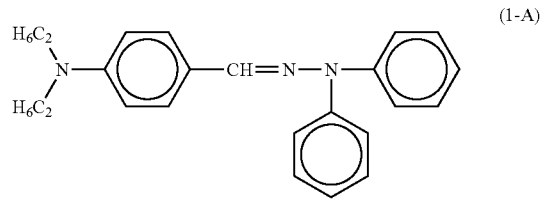

(1-A)

Ip = 5.23 eV

-continued
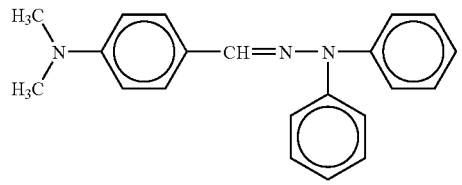
Ip = 5.28 eV
(1-B)
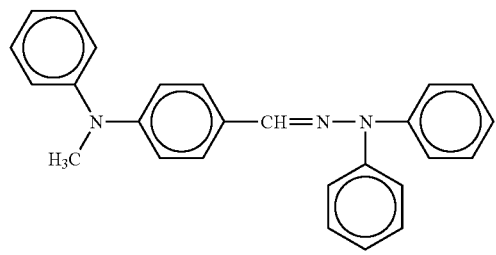
Ip = 5.47 eV
(1-C)
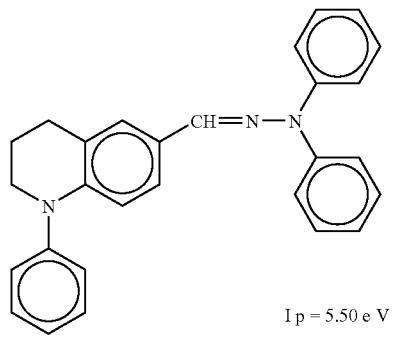
Ip = 5.50 eV
(1-D)
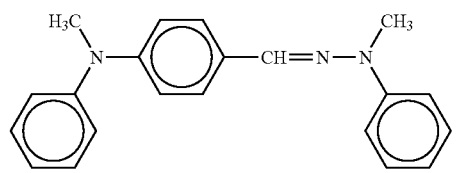
Ip = 5.38 eV
(1-E)
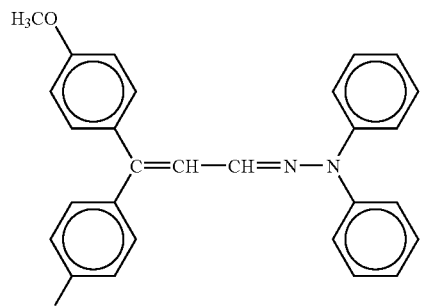
Ip = 5.35 eV
(1-F)

-continued
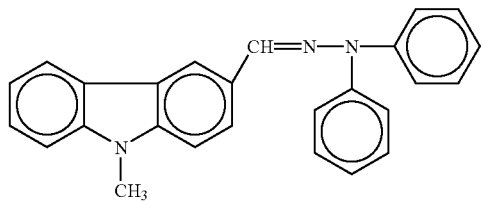
Ip = 5.28 eV
(1-G)
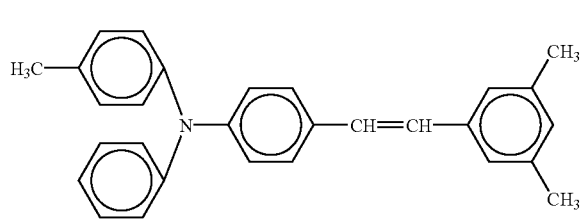
Ip = 5.42 eV
(2-A)
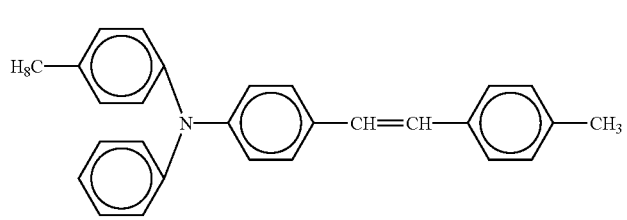
Ip = 5.45 eV
(2-B)
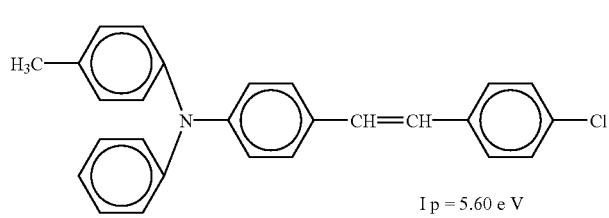
Ip = 5.60 eV
(2-C)
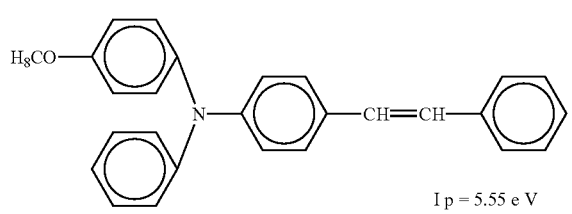
Ip = 5.55 eV
(2-D)
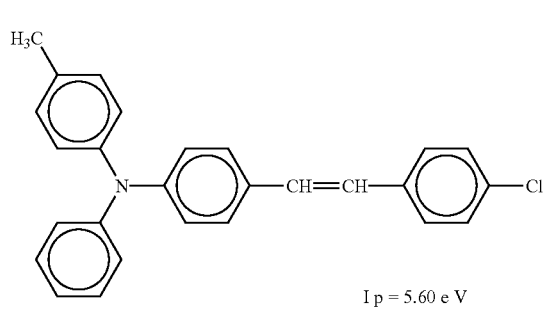
Ip = 5.60 eV
(2-E)

-continued
(2-F)
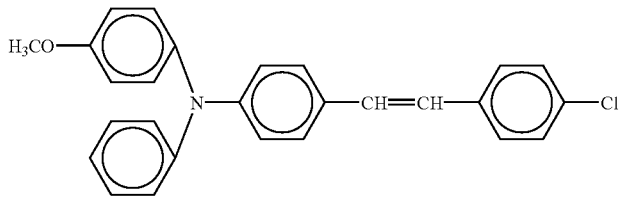
I p = 5.55 e V
(2-G)
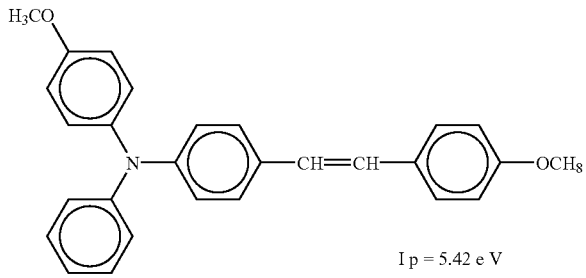
I p = 5.42 e V
(2-H)
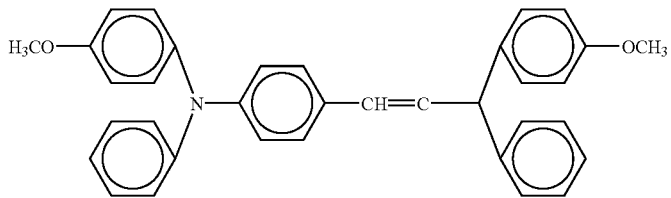
I p = 5.42 e V
(2-I)
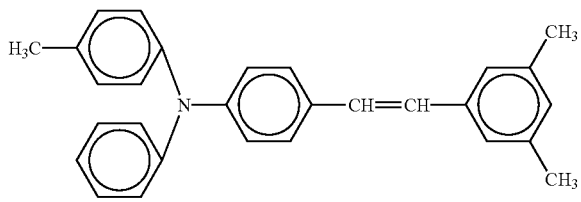
I p = 5.52 e V
(2-J)
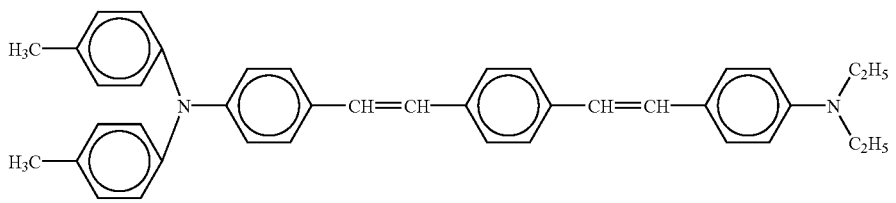
I p = 5.35 e V
(2-K)
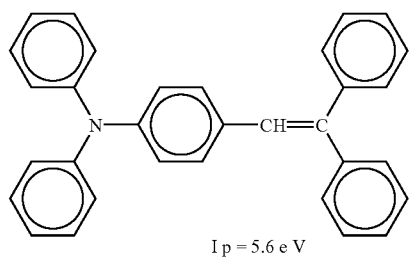
I p = 5.6 e V -continued
(3-A)
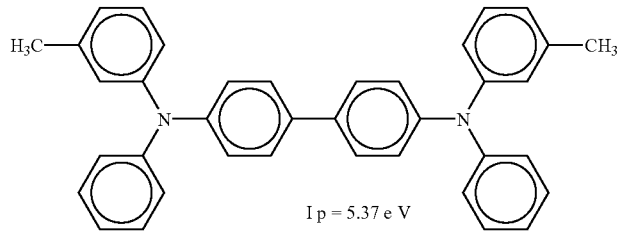
Ip = 5.37 eV
(3-B)
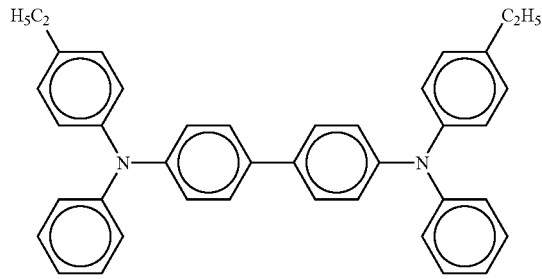
Ip = 5.30 eV
(3-C)
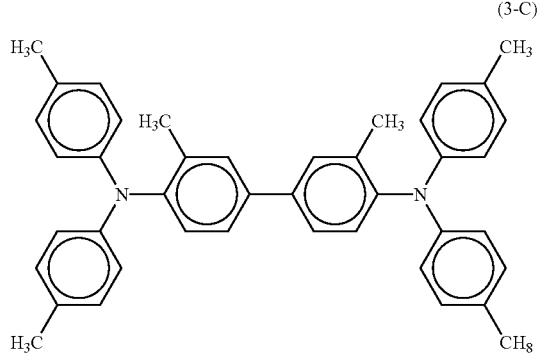
Ip = 5.55 eV
(3-D)
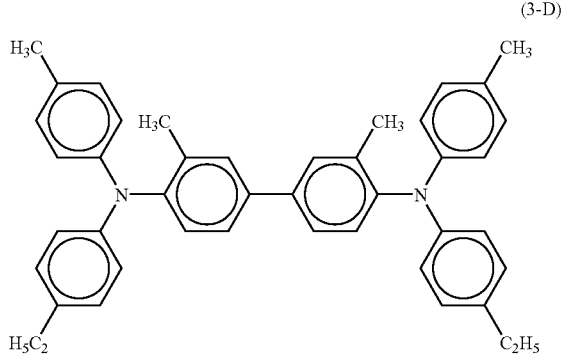
Ip = 5.47 eV
(3-E)
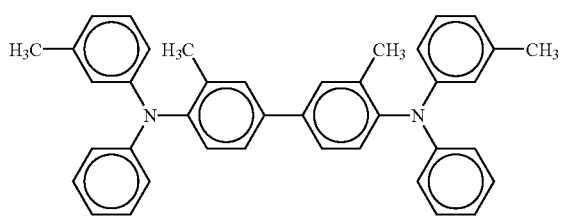
Ip = 5.70 eV -continued
(3-F)
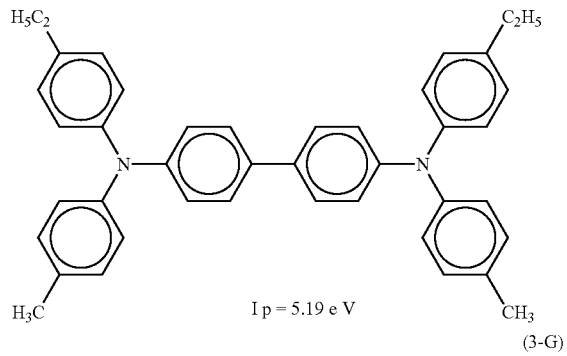
Ip = 5.19 eV
(3-G)
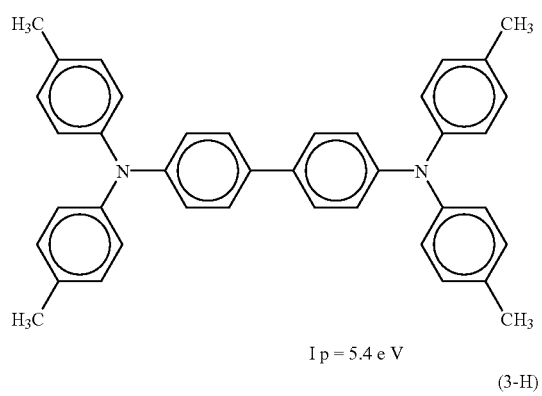
Ip = 5.4 eV
(3-H)
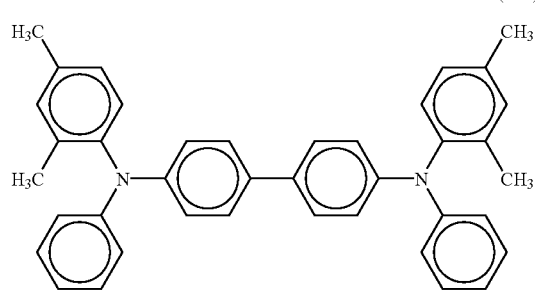
Ip = 5.43 eV
(4-A)
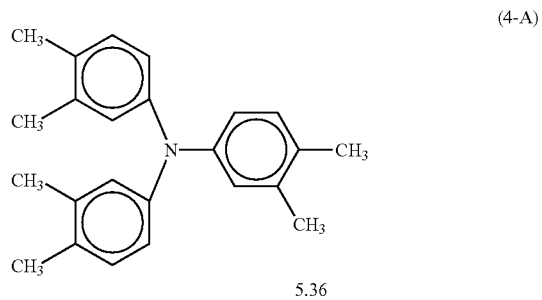
5.36
(4-B)
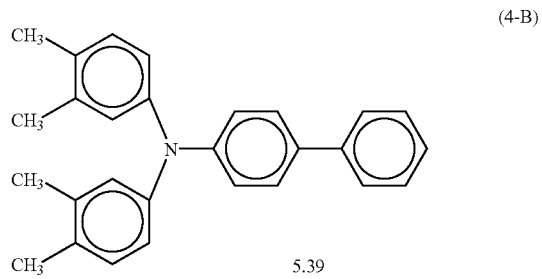
5.39

-continued
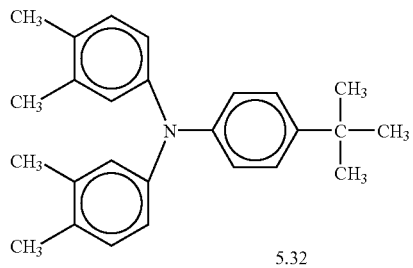
(4-C) 5.32
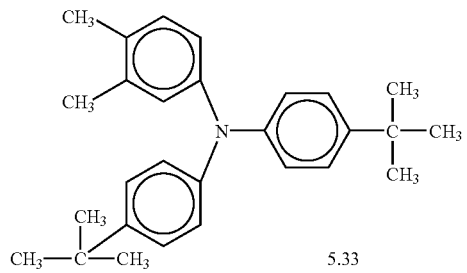
(4-D) 5.33
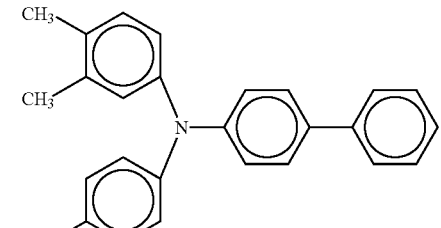
(4-E) 5.34
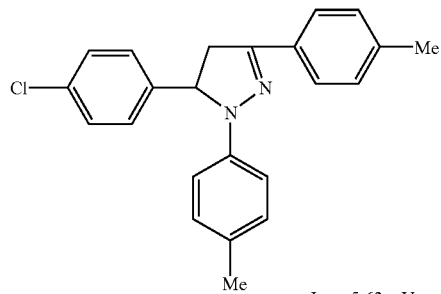
(5-A)
Ip = 5.63 eV
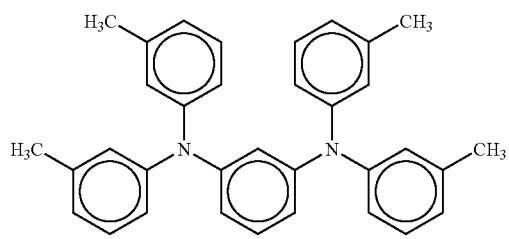
(5-B)
Ip = 5.63 eV

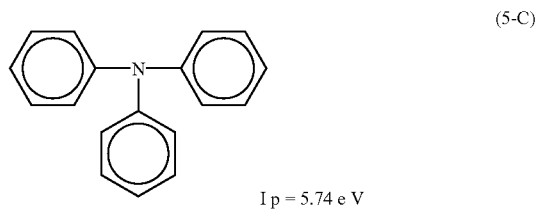
(5-C)
Ip = 5.74 eV
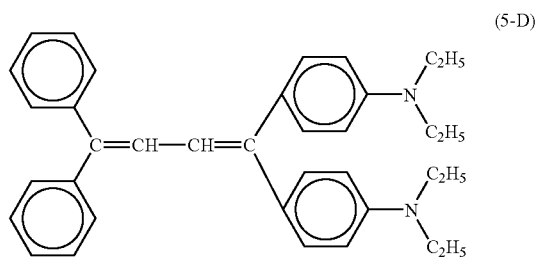
(5-D)
Ip = 5.32 eV
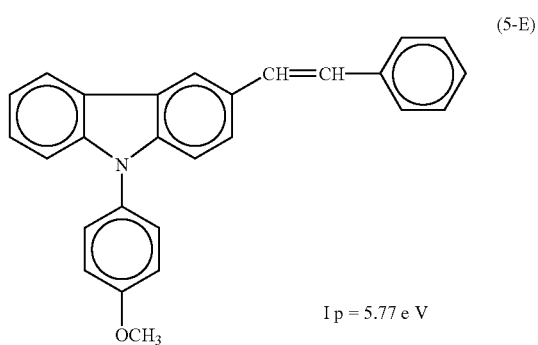
(5-E)
Ip = 5.77 eV
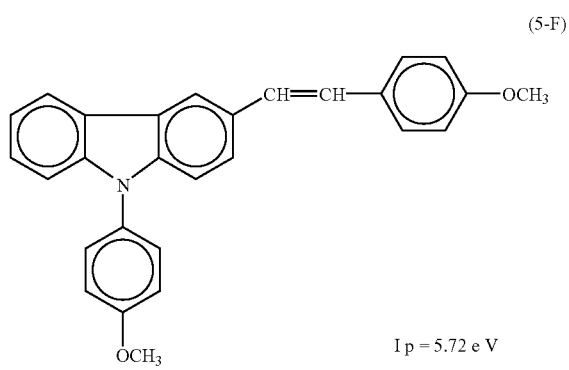
(5-F)
Ip = 5.72 eV Particularly useful examples of negative charge transport material include compounds having the following structural formulae (Compound 6-A to Compound 6-P).
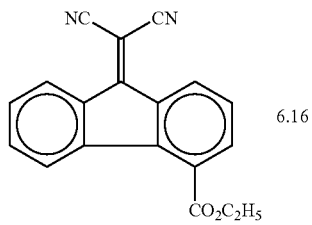
(6-A) 6.16
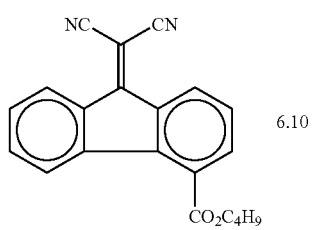
(6-B) 6.10
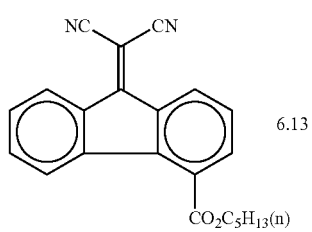
(6-C) 6.13
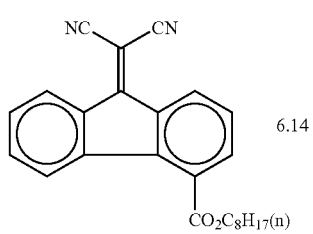
(6-D) 6.14
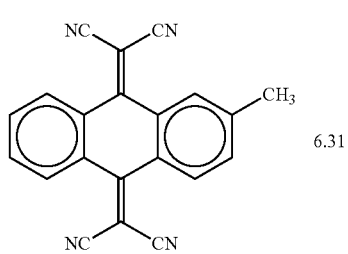
(6-E) 6.31
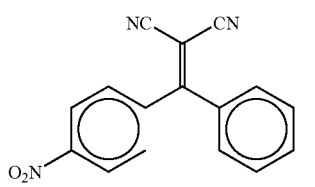
(6-F) 6.19
-continued
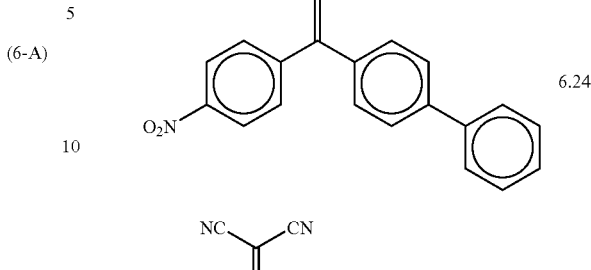
(6-G) 6.24
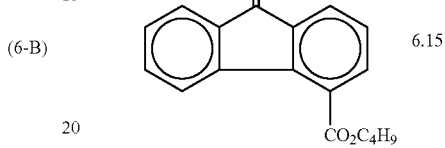
(6-H) 6.15
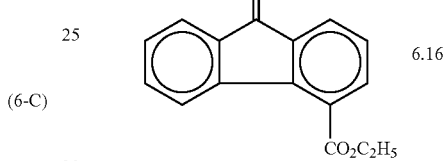
(6-I) 6.16
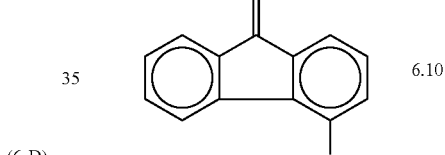
(6-J) 6.10
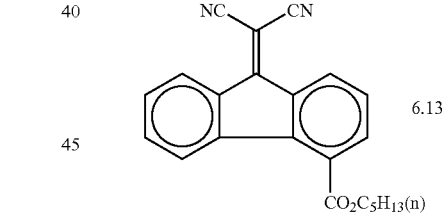
(6-K) 6.13
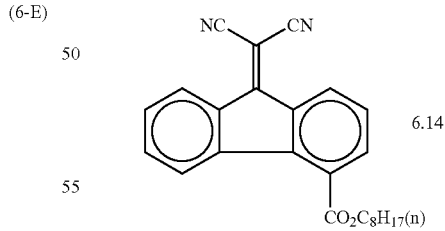
(6-L) 6.14
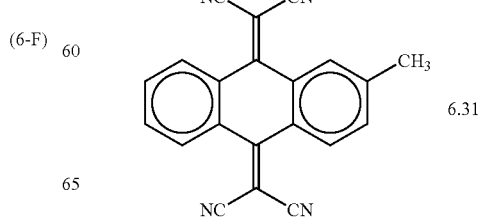
(6-M) 6.31

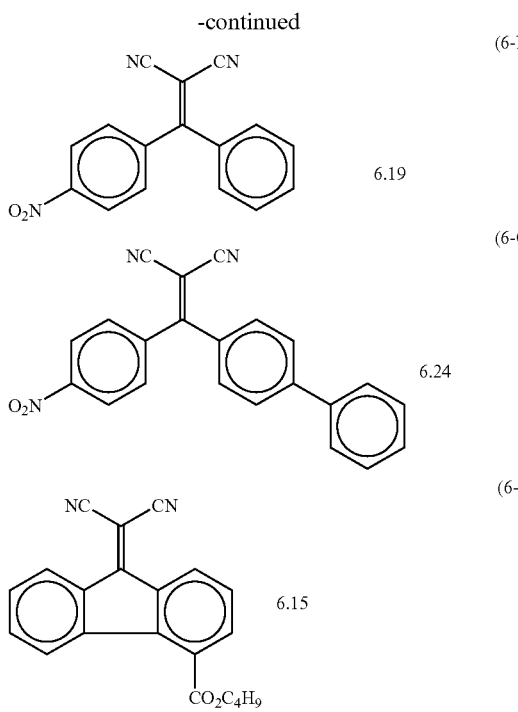

Even more desirable from these charge transport materials are Compound 4-B, which is a triphenylamine-based compound, and Compounds 3-A, 3-B and 3-D, which are benzidine-based compounds, because they have a low ionization potential and a high compatibility with the binder.

By nomenclature, at least one benzidine-based compound selected from the group consisting of N,N'-bis(3-methylphenyl)-N,N'-diphenyl-(1,1'-biphenyl)-4,4'-diamine, N,N'-bis(3-ethylphenyl)-N,N'-diphenyl-(1,1'-biphenyl)-4,4'-diamine, N,N'-bis(3-ethylphenyl)-N,N'-diphenyl-(1,1'-biphenyl)-4,4'-diamine and N,N'-bis(3-ethylphenyl)-N,N'-bis(3-methylphenyl)-(1,1'-biphenyl)-4,4'-diamine or N,N-bis(3,4-dimethylphenyl)bisphenyl-4-amine, which is a triphenylamine-based compound, is preferred.

The pair of charge generation layers are required to generate carrier and free electron to the same degree and thus are required to be equally sensitive to wavelength, light amount and voltage. The two charge generation layers preferably are made of the same material but may be made of different materials so far as the two layers have almost the same sensitivity. A photo-writing type recording medium comprising an upper charge generation layer and a lower charge generation layer which are made of charge generation materials having different sensitivities gives a voltage waveform having a great asymmetry with respect to 0 V under the application of a.c. electric field when irradiated with light.

In the case where the pair of charge generation layers are formed by different charge generation materials, it is only necessary that the ionization potential of the various charge generation materials and the ionization potential of the charge transport material of the charge transport material satisfy the relationship (1). Of course, the ionization potential of the different charge generation materials are preferably as close to each other as possible.

The formation of the charge generation layer can be accomplished by a dry film-forming method such as vacuum evaporation method and sputtering method or a spin coating method or dipping method with a coating solution containing the foregoing charge generation material or charge transport material. None of these methods requires heating of substrate or severe process control as in the preparation of a-Si or photodiode.

When the coating solution is used, the concentration of the foregoing charge generation material in the coating solution is preferably in a range of from 1% by mass to 20% by mass, more preferably in a range of from 1.5% by mass to 5% by mass. On the other hand, the concentration of the foregoing charge transport material in the coating solution is preferably in a range of from 5% by mass to 50% by mass, more preferably in a range of from 10% by mass to 20% by mass.

The foregoing coating solution has a binder resin. As the binder resin to be used herein there may be used any known binder resin commonly used in the formation of the photosensitive layer in the photoreceptor of electrophotograph without any problem. Specific examples of such a binder resin include insulating resins such as polyvinyl acetal resin (e.g., polyvinyl butyral resin, polyvinyl formal resin, partly acetalated polyvinyl butyral resin having butyral partly modified by formal or acetoacetal), polyarylate resin (e.g., polycondensation product of bisphenol A and phthalic acid), alcohol-soluble nylon, polycarbonate resin, polyester resin, modified ether type polyester resin, phenoxy resin, polyvinyl chloride resin, polyvinylidene chloride resin, polyvinyl acetate resin, polystyrene resin, acrylic resin, methacrylic resin, polyacrylamide resin, polyamide resin, polyvinyl pyridine resin, cellulose resin, polyurethane resin, epoxy resin, silicone resin, polyvinyl alcohol resin, polyvinyl pyrrolidone resin, casein, vinyl chloride-vinyl acetate copolymer (e.g., vinyl chloride-vinyl acetate copolymer, hydroxyl-modified vinyl chloride-vinyl acetate copolymer, carboxyl-modified vinyl chloride-vinyl acetate copolymer, vinyl chloride-vinyl acetate-maleic anhydride copolymer), styrene-butadiene copolymer, vinylidene chloride-acrylonitrile copolymer, styrene-alkyd resin, silicon-alkyd resin and phenol-formaldehyde resin. resin, silicon-alkyd resin and phenol-formaldehyde resin. These binder resins may be used singly or in combination of two or more thereof.

The concentration of such a binder resin in the foregoing coating solution for the charge generation layer is preferably in a range of from 0.1% by weight to 20% by weight, more preferably in a range of from 0.5% by weight to 5% by weight. On the other hand, the concentration of the binder resin in the coating solution for the charge transport layer is preferably in a range of from 1% by weight to 50% by weight, more preferably in a range of from 2% by weight to 30% by weight.

The solvent for preparing the coating solution may be, for example, alcohols such as methanol, ethanol, n-propanol, i-propanol, n-butanol and benzyl alcohol, ketones such as acetone, methyl ethyl ketone and cyclohexanone, amides such as dimethylformamide and dimethylacetamide, sulfoxides such as dimethyl sulfoxide, cyclic or chain-like ethers such as tetrahydrofurane, dioxane, diethyl ether, methyl cellosolve and ethyl cellosolve, esters such as methyl acetate, ethyl acetate and n-butyl acetate, aliphatic halogenated hydrocarbons such as methylene chloride, chloroform, carbon tetrachloride, chloroethylene and trichloroethylene, mineral oils such as ligroin, aromatic hydrocarbons such as benzene, toluene and xylene, and aromatic halogenated hydrocarbons such as chlorobenzene and dichlorobenzene.

The thickness of the foregoing charge generation layer is preferably in a range of from 10 nm to 1 µm, more preferably in a range of from 20 nm to 500 nm. When the thickness of the foregoing charge generation layer is less than 10 nm, the charge generation layer lacks photosensitivity and can difficultly be uniformly prepared. On the contrary, when the thickness of the foregoing charge generation layer is greater than 1 μm, the charge generation layer exhibits saturated photosensitivity and is subject to exfoliation due to stress in the layer.

The thickness of the foregoing charge transport layer is preferably in a range of from 0.1 μm to 100 μm, more preferably in a range of from 0.1 μm to 10 μm. When the thickness of the charge transport layer is less than 0.1 μm, the charge transport layer exhibits a deteriorated electrical strength that makes it difficult to give assured reliability. On the contrary, when the thickness of the charge transport layer is greater than 100 μm, the charge transport layer can difficultly match with the functional element in impedance, making the design difficult. Thus, the above defined range is desirable.

As described above, the pair of the charge generation layer and the charge transport layer is formed so that the former sandwiches the latter therebetween to form the optical switching layer.

Alternatively, by further forming a charge generation layer between the charge transport layers, a structure having charge generation layer/charge transport layer/charge generation layer/charge transport layer/charge generation layer may be formed.

b) Substrate and Transparent Substrate

In the photo-writing type recording medium of the invention, a substrate is formed an electrode layer on one surface thereof and a transparent substrate is formed a transparent electrode layer on one surface thereof. The substrate and the transparent substrate are disposed so that the electrode layer and the transparent electrode layer are on inside surfaces, respectively (in other words, both layers are opposed to each other). In other words, a combination of a pair of substrate and electrode is disposed to be opposed to each other.

One of the pair of substrates is a transparent substrate. The other of the pair of substrates may be either a transparent or opaque substrate. In the case where photo-writing and image display are effected on only one side of the photo-writing type recording medium, only one of the pair of substrates may be transparent. The term "transparent" means characteristic for substantially transmitting light for photo-writing and/or visible light.

Examples of the transparent substrate employable herein include glass, PET (polyethylene terephthalate), PC (polycarbonate), polyethylene, polystyrene, polyimide, and PES (polyethersulfone). A light-transmitting plastic substrate can be used for advantage because it can form a flexible substrate, can be easily formed, and can reduce the cost.

The opaque substrate is not specifically limited. Examples of the opaque substrate employable herein include silicon substrate, colored PET, colored polyester, and colored polyimide.

The thickness of the substrate is not specifically limited. In practice, however, the thickness of the substrate is in a range of from about 50 μm to 1,000 μm.

The substrate has an electrode layer formed thereon. At least the electrode layer formed on the surface of the transparent substrate is a transparent electrode layer. Of course, the electrode layer formed on the surface of the opaque substrate may or may not be transparent.

As the transparent electrode layer, there may be used an ITO layer, Au, $SnO_2$, Al, Cu, organic electrically-conductive film or the like. As the opaque electrode layer, there may be used any metal layer which is not specifically limited. Alternatively, a material which acts as both substrate and electrode such as ITO and metal plate may be used.

The thickness of the electrode layer is not specifically limited. In practice, however, the thickness of the electrode layer is in a range of from about 10 nm to about 10 μm.

c) Display Element Layer

In the invention, the display element layer to be formed with the optical switching layer interposed between the pair of substrates is a layer capable of displaying an image under the application of a voltage via the optical switching layer. As the display element layer to be used herein, it is preferably to use one having memory properties.

When a liquid crystal display element layer is taken as an example of the display element having memory properties, the display element having memory properties can keep orientation of a liquid crystal for a predetermined period of time after the liquid crystal is applied voltage to control the orientation thereof and the application of the voltage is terminated. Examples of the liquid crystal display element layer employable herein include ferroelectric liquid crystal such as polymer-dispersed liquid crystal (PDLC) and chiral smectic C phase, smectic liquid crystal, discotic liquid crystal, cholesteric liquid crystal, and nematic liquid crystal which has been provided with PDLC or encapsulation to have memory properties. Further, liquid crystal elements obtained by encapsulating these liquid crystals may be used. Moreover, an electrophoretic element, an electric field rotation type element or an electrochromic element may be used. Particularly preferred among these liquid crystals is cholesteric liquid crystal because it has a high reflectance and an excellent display performance.

The method for the formation of the display element layer is not specifically limited. Various known methods for the formation of display element layer can be employed without any problem. Examples of these methods include cell injection method, screen printing method, blade coating method, spray coating method, die coating method, gravure coating method, spin coating method, vacuum evaporation method, and sputtering method.

d) Other Various Layers

In the invention, the photo-writing type recording medium may comprise other various layers incorporated therein besides the various essential layers.

For example, a d.c. component-removing film described in paragraph 0024 to paragraph 0025 of JP-A-2000-180888 and a functional layer (separating layer) for preventing the injection of carrier may be formed between the electrode and the charge generation layer. Moreover, a reflective layer or light shielding layer may be formed. A functional layer having these functions in combination may be formed.

Such a functional layer may be used so far as the flow of electric current cannot be remarkably prevented.

<Manufacturing Method for the Photo-writing Type Recording Medium>

A manufacturing method for manufacturing an a.c. driving system photo-writing type recording medium, the method has the steps of forming an optical switching layer on an electrode side surface of a substrate on which an electrode is formed (or on a transparent electrode side surface of a transparent substrate on which the transparent electrode layer is formed), forming a display element layer on a transparent electrode side surface of a transparent substrate on which a transparent electrode is formed (or on an electrode side surface of a substrate on which an electrode is formed), and laminating an optical switching layer side surface of the substrate and a display element layer side surface of the transparent substrate with each other, in which in the optical switching layer forming step, a first charge generation layer having a charge generation material, a charge transport layer having charge transport material, and a second charge generation layer having the charge generation material are layered subsequently and in which in the layering step, the charge generation material and the charge transportation material are selected to satisfy the following equation (1), $$|Ipcgl - Ipctl| \leq 0.5 \text{ eV} \quad (1)$$

where Ipcgl is an ionization potential of the charge generation material and Ipctl is an ionization potential of the charge transport material.

The lamination of the two substrates can be accomplished by any known method such as method involving adhesion with an adhesive and heat contact bonding. Referring to the combination of substrate and electrode, the substrate having an optical switching layer formed thereon may be transparent. Alternatively, the substrate having a display element layer formed thereon may be transparent. Further, both the two substrates may be transparent. The preferred relationship between the ionization potential Ipcgl of the charge generation material and the ionization potential Ipctl of the charge transport material and concept thereof are as defined in the article <photo-writing type recording medium>. Further, the detailed structure of the various layers and the detailed process for the formation of the various layers are as defined in detail in the article <photo-writing type recording medium>. Thus, the description of these factors will be omitted.

Either the optical switching layer or the display element layer may be formed first. In other words, when one of the combinations of substrate and electrode layer is not transparent, the various layers may be successively formed to give a desired layer structure.

<Writing on Photo-writing Type Recording Medium>

In operation, the photo-writing type recording medium of the invention is irradiated with light like an image on the transparent substrate side thereof, if one of the pair of substrates is opaque, while an a.c. voltage is being applied to the pair of electrode layers one of which is transparent to effect writing.

The voltage to be applied is an a.c. voltage. The waveform of the a.c. voltage may be sinusoidal, rectangular, triangular, combination thereof or any other form. Of course, the application of some bias component may be effective depending on the configuration of the display element layer. This arrangement may be applied without any problem.

Figure 4:
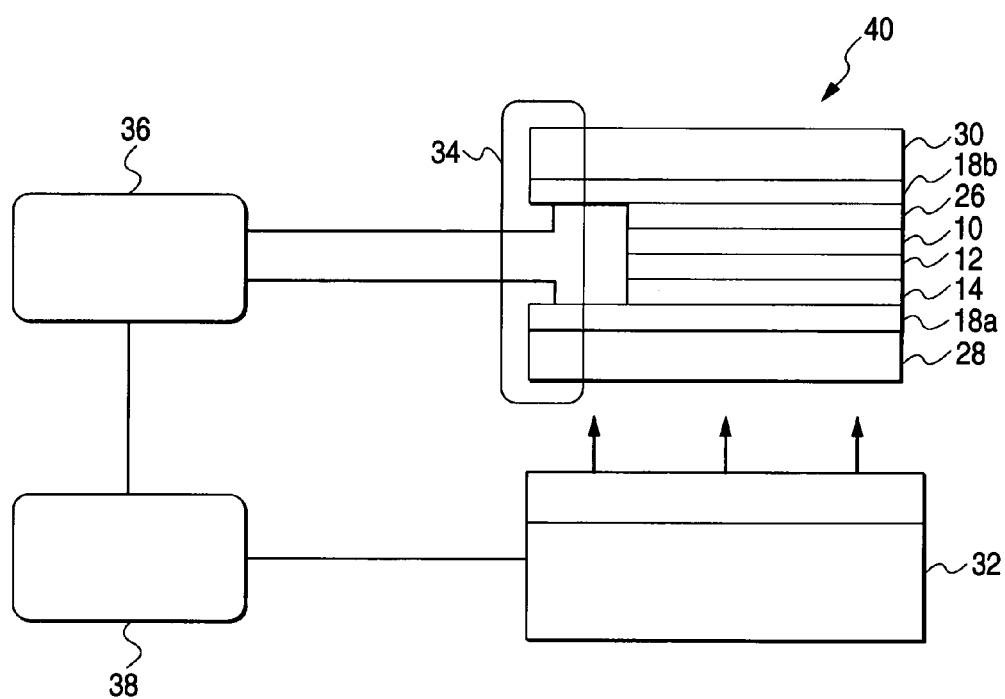
FIG. 4 is a schematic diagram illustrating an example of the concept of a system for writing on the photo-writing type recording medium of the invention.

FIG. 4 illustrates an example of the concept of the system for writing on the photo-writing type recording medium of the invention. FIG. 4 shows a system for writing on a photo-writing type recording medium 40 of the invention having an optical switching element layer having a transparent electrode layer 18a, a lower charge generation layer (CGL) 14, a charge transport layer (CTL) 12 and an upper charge generation layer (CGL) 10, a display element layer 26, a transparent electrode layer 18b and a display side substrate 30 formed on a light-receiving side substrate 28 made of glass, plastic or the like.

The upper and lower transparent electrode layers 18a and 18b of the photo-writing type recording medium 40 are each connected to a connector 34 so that a voltage from a voltage applying unit 36 can be applied thereto. The connector 34, the voltage applying unit 36, a photo-writing unit 32, and a controlling unit 38 for controlling the voltage applying unit 36 and the photo-writing unit 32 form a photo-writing device. The photo-writing device may have these parts integrated or separated.

The connector 34 is a connector for connecting to the transparent electrode layer 18a and the transparent electrode layer 18b and has a contact point at the respective sides. Of course, the connector 34 can be removable.

The voltage applying unit 36 applies a driving pulse for display in synchronization with photo-writing by the photo-writing unit and has a unit for producing a pulse to be applied and a unit for detecting a trigger input to be outputted. As such a pulse producing unit, a unit may be employed, which has a waveform storing unit such as ROM, a DA conversion unit, and a control unit. When applying voltage, the unit converts a waveform read from the ROM to apply the converted waveform to a space modulation device. In place of the ROM, a unit for generating a pulse with an electric circuit system such as a pulse generation circuit may be available. In addition, a unit is not limited to the above so long as the unit applies a driving pulse.

The photo-writing unit 32 has a unit for producing a pattern of light which is incident on the light-receiving side of the photo-writing type recording medium 40 and a light irradiation unit for irradiating the pattern of light onto the space modulation device. In order to produce a pattern of light, a transmission type display such as liquid crystal display having TFT and single matrix liquid crystal display can be used. As the light irradiation unit, there may be used any unit capable of irradiating light onto a space modulation device such as fluorescent light, halogen lamp, and electroluminescence (EL). Alternatively, a light-emitting display such as EL display or CRT which acts as both a pattern producing unit and light irradiation unit and field emission display (FED) may be used. Besides these units, any unit capable of controlling the light amount, wavelength and irradiated pattern can be used without any problem.

The controlling unit 38 has a unit for converting image data received into data to be displayed as well as controlling the operation of the foregoing units.

The photo-writing type recording medium of the invention can be written an image by the photo-writing device having the foregoing configuration. Once written on the photo-writing type recording medium, the image can be retained even if the photo-writing type recording medium is disconnected from the connector 34 so that the photo-writing type recording medium can be subjected to public perusal, circulation, distribution, etc. Further, by connecting the photo-writing type recording medium again to the connector 34 and then applying a voltage thereto, the image which has been written can be deleted or another image can be written thereon. Thus, the invention can meet requirements for saving of resources.

EXAMPLE

The invention will be further described in the following examples. Of course, the invention is not limited to the following examples.

Example 1

A photo-writing type recording medium of the invention was prepared in the following manner.

A charge generation layer was formed on a polyethylene terephthalate (PET) substrate (thickness: 125 µm) having an ITO layer (thickness: 800 Å) formed thereon as an electrode layer on the ITO layer side thereof. In some detail, as a charge generation material there was used hydroxygallium phthalocyanine having an ionization potential of 5.31 eV (having a strong diffraction peak in a Bragg angle (2θ±0.2°) of X-ray diffraction spectrum at 7.0°, 7.5°, 10.5°, 11.7°, 12.7°, 17.3°, 18.1°, 24.5°, 26.2° and 27.1°). As a binder resin there was used a polyvinyl butyral. The ratio of the charge generation material and the binder resin by weight was 1:1. These materials were then dispersed in butanol to prepare a 4% by weight dispersion (coating solution A). The coating solution A was applied to the substrate by a spin coating method, and then dried to form a charge generation layer having a thickness of 0.2 μm.

Subsequently, a charge transport layer was formed on the charge generation layer. In some detail, N-bis(3,4-dimethylphenyl)bisphenyl-4-amine, which is a triphenylamine compound having an ionization potential of 5.39 eV represented by the structural formula (Compound 4-B), as a charge transport material and a polycarbonate {bisphenol-Z, (poly(4,4'-cyclohexylidenediphenylene carbonate))} as a binder resin were mixed at a ratio of from 40% by weight to 60% by weight. The mixture was then dissolved in monochlorobenzene to prepare a 10% by weight solution (coating solution B). The substrate was dipped in the coating solution B, and then withdrawn therefrom at a rate of 120 mm/min to form a charge transport layer on the charge generation layer to a thickness of 3 μm.

The coating solution A was applied to the charge transport layer by a spin coating method, and then dried to form a charge generation layer to a thickness of 0.2 μm. ǀIpcgl–Ipctlǀ was 0.08 eV.

Thus, an optical switching layer was formed.

In order to form a separating layer on the optical switching layer, a 3% by weight aqueous solution of polyvinyl alcohol was applied to the optical switching layer by a spin coating method to form a polyvinyl alcohol layer to a thickness of 0.2 μm.

On the separating layer were then formed a light shielding layer, a display element layer comprising a capsule liquid crystal element, a transparent electrode layer and a transparent substrate in the following manner.

In 74.8 parts by weight of a nematic liquid crystal E8 having a positive dielectric anisotropy (produced by Merck Co., Ltd.) were heat-dissolved 21 parts by weight of a chiral agent CB15 (produced by BDH) and 4.2 parts by weight of a chiral agent R1011 (produced by Merck Co., Ltd.). The solution thus obtained was then allowed to cool to room temperature to obtain a chiral nematic liquid crystal which selectively reflects bluish green light.

Three parts by weight of an adduct including 3 mols of xylene diisocyanate and 1 mol of trimethylolpropane (D-110N, produced by Takeda Chemical Industries, Ltd.) and 100 parts by weight of ethyl acetate were added to 10 parts by weight of the blue green chiral nematic liquid crystal thus obtained to make a uniform solution as an oil phase solution.

Separately, 10 parts by weight of a polyvinyl alcohol (POVAL, produced by KURARAY CO., LTD.) were added to 1,000 parts by weight of heated ion-exchanged water. The mixture was stirred, and then allowed to cool to prepare an aqueous phase solution.

Subsequently, using a household mixer energized to 30 V a.c. by a slidax, 10 parts by weight of the oil phase were emulsion-dispersed in 100 parts by weight of the aqueous phase for 1 minute to prepare a oil-in-water emulsion having oil phase droplets dispersed in an aqueous phase. The oil-in-water emulsion was stirred over a 60° C. water bath for 2 hours to complete the interfacial polymerization. Thus, a liquid crystal microcapsule was formed. The liquid crystal microcapsule thus obtained was then measured for average particle diameter by means of a laser particle size distribution meter. The average particle diameter of the liquid crystal microcapsule was estimated to about 12 μm.

The liquid crystal microcapsule dispersion thus obtained was filtered through a stainless steel mesh having a mesh size of 38 μm, and then allowed to stand overnight. The resulting opaque white supernatant solution was then removed from the solution to obtain a slurry of liquid crystal microcapsule having a solid content of about 40% by weight.

To the slurry thus obtained was then added a 10% by weight solution of polyvinyl alcohol containing a polyvinyl alcohol in an amount of ⅔ of the weight of the solid component to prepare a coating solution C.

The coating solution C thus obtained was then applied to a PET film (transparent substrate having a thickness of 125 μm produced by Toray High Beam Co., Ltd.) with an ITO layer (transparent electrode layer having a thickness of 800 Å) on the ITO layer side thereof by means of a #44 wire bar to form a display element layer containing a liquid crystal.

To the PET film having an optical switching layer and a separating layer formed thereon on the separating layer side thereof was applied a black polyimide BKR-105 (produced by NIPPON KAYAKU CO., LTD.) to form a light shielding layer (thickness: 1 μm). DIC DRY WS-321A/LD-55 (produced by DAINIPPON INK AND CHEMICALS, INCORPORATED) as a fully aqueous dry laminate adhesive was applied to the PET film, and then dried to form an adhesive layer having a thickness of 4 μm. The PET film was then laminated with the PET film having a display element layer formed thereon with the display element layer and the adhesive layer in contact with each other at a temperature of 70° C. to obtain a monochromatic display photo-writing type recording medium.

Example 2

A monochromatic display photo-writing type recording medium was prepared in the same manner as in Example 1 except that as the charge generation material and charge transport material there were used titanylophthalocyanine having an ionization potential of 5.38 eV (having a strong diffraction peak in a Bragg angle (2θ±0.2°) of X-ray diffraction spectrum at 9.5°, 9.7°, 11.7°, 15.0°, 23.5°, 24.1° and 27.3°) and a material having an ionization potential of 5.37 eV represented by the structural formula (Compound 3-A), respectively. ǀIpcgl–Ipctlǀ was 0.01 eV.

Example 3

A monochromatic display photo-writing type recording medium was prepared in the same manner as in Example 1 except that as the charge generation material and charge transport material there were used chlorogallium phthalocyanine having an ionization potential of 5.41 eV (having a strong diffraction peak in a Bragg angle (2θ±0.2°) of X-ray diffraction spectrum at 7.4°, 16.6°, 25.5° and 28.3°) and N,N'-bis(3-methylphenyl)-N,N'-diphenyl-(1,1'-biphenyl)-4,4'-diamine, which is a benzidine-based compound having an ionization potential of 5.37 eV represented by the structural formula (Compound 3-B), respectively. ǀIpcgl–Ipctlǀ was 0.04 eV.

Example 4

A monochromatic display photo-writing type recording medium was prepared in the same manner as in Example 1 except that as the charge generation material and charge transport material there were used a metal-free phthalocyanine having an ionization potential of 5.15 eV and N,N'-bis(3-methylphenyl)-N,N'-diphenyl-(1,1'-biphenyl)-4,4'-diamine, which is a benzidine-based compound having an ionization potential of 5.37 eV represented by the structural formula (Compound 3-B), respectively. |Ipcgl–Ipctl| was 0.22 eV.

Example 5

A monochromatic display photo-writing type recording medium was prepared in the same manner as in Example 1 except that as the charge generation material and charge transport material there were used an azo compound having an ionization potential of 5.92 eV represented by the structural formula (azo-C) and a styryl triphenylamine compound having an ionization potential of 5.6 eV represented by the structural formula (Compound 2-E), respectively. |Ipcgl–Ipctl| was 0.32 eV.

Comparative Example 1

A monochromatic display photo-writing type recording medium was prepared in the same manner as in Example 1 except that as the charge generation material and charge transport material there were used an azo compound having an ionization potential of 5.92 eV represented by the structural formula (azo-C) and N,N-bis(3,4-dimethylphenyl)bisphenyl-4-amine, which is a triphenylamine compound having an ionization potential of 5.39 eV represented by the structural formula (Compound 4-B), respectively. |Ipcgl–Ipctl| was 0.53 eV.

Comparative Example 2

A comparative photo-writing type recording medium was prepared in the following manner.

Chlorogallium phthalocyanine having an ionization potential of 5.3 eV (having a strong diffraction peak in a Bragg angle (2θ±0.2°) of X-ray diffraction spectrum at 7.4°, 16.6°, 25.5° and 28.3°) as a charge generation material was applied to a polyether sulfone (PES) film (thickness: 125 μm) with an ITO layer (transparent electrode layer having a thickness of 800 Å) in the same manner as in Example 1 to form a charge generation layer to a thickness of 0.2 μm.

Subsequently, a charge transport layer was formed on the charge generation layer. In some detail, a charge transport material having an ionization potential of 6.1 eV represented by the structural formula (Compound 6-B) and a polycarbonate {bisphenol-Z, (poly(4,4'-cyclohexylidenediphenylene carbonate))} as a binder resin were mixed at a ratio of 40% by weight to 60% by weight. The mixture was then dissolved in monochlorobenzene to prepare a 10% by weight solution (coating solution D). The substrate was dipped in the coating solution D, and then withdrawn therefrom at a rate of 120 mm/min to form a charge transport layer on the charge generation layer to a thickness of 3 μm. |Ipcgl–Ipctl| was 0.8 eV.

The subsequent procedure was followed in the same manner as in Example 1 to obtain a monochromatic display photo-writing type recording medium.

Evaluation Test

Figure 3:
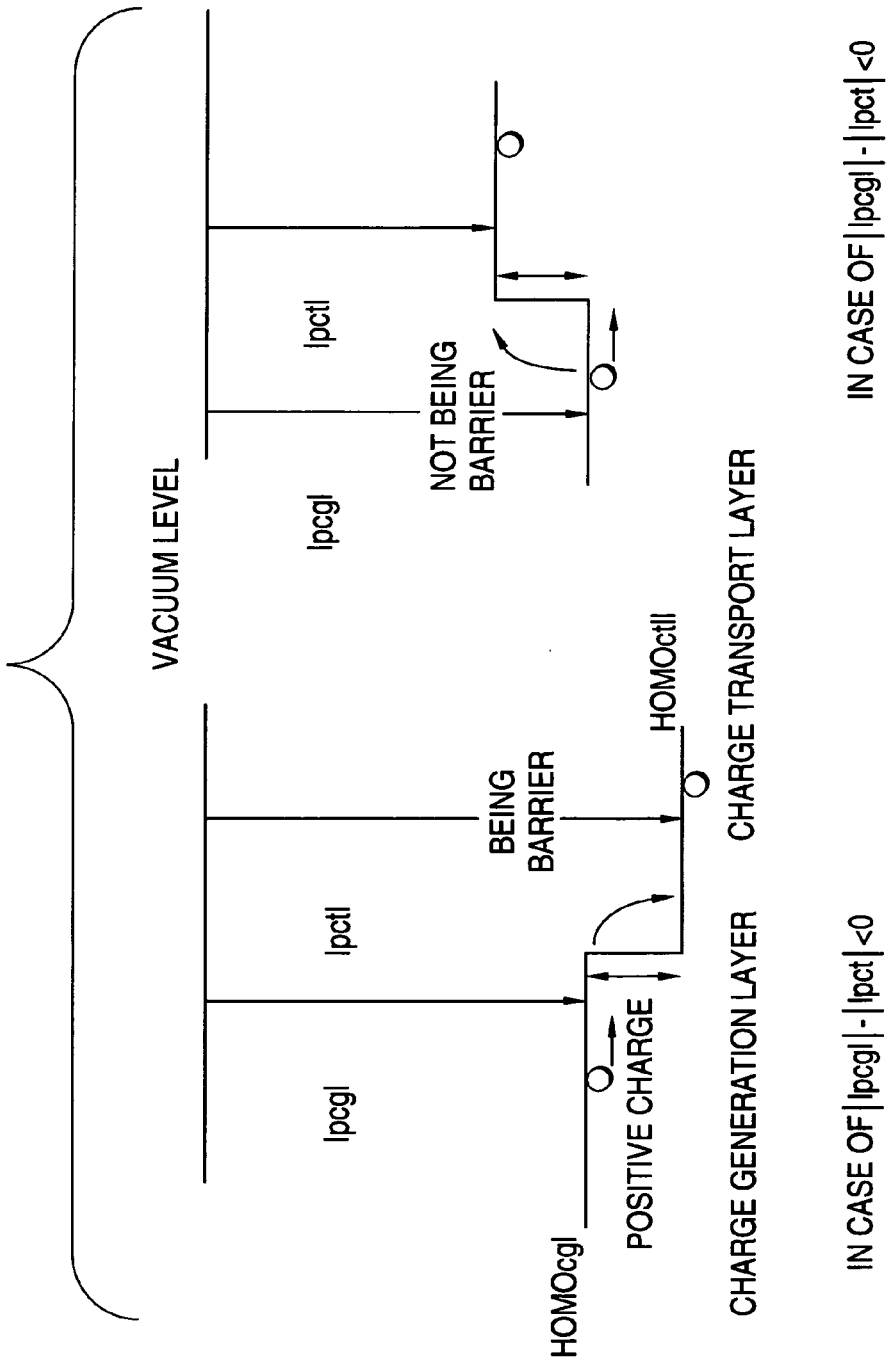
FIG. 3 is a diagram illustrating an energy model of charge transportation.

Using a photo-writing device comprising a connector 34, a voltage applying unit 36, a photo-writing unit 32 and a controlling unit 38 as shown in FIG. 3, an image was written on the photo-writing type recording media of the various examples and comparative examples thus obtained. In some detail, the two transparent electrode layers in the photo-writing type recording media of the various examples and comparative examples were connected to the connector 34. In order to input an image to the photo-writing type recording media, the photo-writing type recording media were each imagewise irradiated with light from the photo-writing unit 32 comprising a monochromatic liquid crystal panel disposed in close contact with the photo-writing type recording media while a rectangular 10 Hz 4-pulse 250 Vpp (300 Vpp for comparative examples) a.c. voltage from the voltage applying unit 36 was being applied thereto.

During this procedure, the intensity of the imagewise light from the photo-writing unit 32 was raised from 50 μW/cm$^2$ by 50 μW/cm$^2$ as measured on the irradiated area. Under these conditions, the intensity of light at which a blue monochromatic image is obtained on the irradiated area was confirmed.

As a result, in Examples 1 to 3, the dark area (1 μW/cm$^2$) and the irradiated area (200 μW/cm$^2$) gave a blue monochromatic image and a black monochromatic image, respectively, demonstrating that these photo-writing type recording media had a high sensitivity. In Examples 4 and 5, the dark area (1 μW/cm$^2$) and the irradiated area (500 μW/cm$^2$) gave a black monochromatic image and a blue monochromatic image, respectively, demonstrating that these photo-writing type recording media had a high sensitivity.

On the contrary, in Comparative Examples 1 and 2, the dark area and the irradiated area were needed to be irradiated with light at an intensity of 1 μW/cm$^2$ and 1 mW/cm$^2$, respectively, to give a black monochromatic image and a blue monochromatic image, respectively, demonstrating that these photo-writing type recording media were inferior to those of the examples in sensitivity.

The foregoing image-writing operation was effected 1,000 times with the intensity of light on the dark area and irradiated area on the image to confirm the durability of image recording. As a result, Examples 1 to 5 remained stable in image recording up to 1,000th operation. On the contrary, Comparative Example 1 showed uneven color due to insufficient deletion at 200th operation. Comparative Example 2 showed uneven color due to insufficient deletion at 100th operation.

As mentioned above, the invention provides a photo-writing type recording medium with a dual CGL structure having a high photosensitivity and a process for the preparation thereof.

What is claimed is:

1. An a.c. driving system photo-writing type recording medium comprising:
   a substrate formed an electrode layer on one side thereof;
   a transparent substrate formed a transparent electrode layer on one side thereof;
   an optical switching layer having:
   a pair of charge generation layers each including a charge generation material; and
   a charge transport layer including a charge transport material, disposed between the pair of charge generation layers, and
   a display element layer, wherein the electrode layer of the substrate and the transparent electrode layer of the transparent substrate are opposed to each other; and wherein the following equation (1) is satisfied $$|Ipcgl - Ipctl| \leq 0.5 \text{ eV} \tag{1}$$

where Ipcgl is an ionization potential of the charge generation material; and Ipctl is an ionization potential of the charge transport material.

2. The photo-writing type recording medium according to claim 1, wherein the charge generation material comprises at least one of chlorogallium phthalocyanine, hydroxygallium phthalocyanine, and titanylophthalocyanine.

3. The photo-writing type recording medium according to claim 1, wherein the charge generation material comprises hydroxygallium phthalocyanine having a strong diffraction peak in Bragg angle (2θ±0.2°) of X-ray diffraction spectrum at one of the following i) to vi), that is:
   i) 7.5°, 9.9°, 12.5°, 16.3°, 18.6°, 25.1° and 28.3°;
   ii) 7.7°, 16.5°, 25.1° and 26.6°,
   iii) 7.9°, 16.5°, 24.4° and 27.60;
   iv) 7.0°, 7.5°, 10.5°, 11.7°, 12.7°, 17.3°, 18.1°, 24.5°, 26.2° and 27.1°;
   v) 6.8°, 12.8°, 15.8° and 26.0°; and
   vi) 7.4°, 9.9°, 25.0°, 26.2° and 28.2°.

4. The photo-writing type recording medium according to claim 1, wherein the charge generation material comprises chlorogallium phthalocyanine having a strong diffraction peak in Bragg angle (2θ≦0.2°) of X-ray diffraction spectrum at one of the following a) to c), that is:
   a) 7.4°, 16.6°, 25.5° and 28.3°;
   b) 6.8°, 17.3°, 23.6° and 26.9°; and
   c) 8.7° to 9.2°, 17.6°, 24.0°, 27.4° and 28.8°.

5. The photo-writing type recording medium according to claim 1, wherein the charge generation material comprises titanyl phthalocyanine having a strong diffraction peak in Bragg angle (2θ≦0.2°) of X-ray diffraction spectrum at 9.5°, 9.7°, 11.7°, 15.0°, 23.5°, 24.1° and 27.3°.

6. The photo-writing type recording medium according to claim 1, wherein the charge transport material comprises one of a benzidine-based compound and triphenylamine-based compound.

7. The photo-writing type recording medium according to claim 1, wherein the display element layer has memory property.

8. The photo-writing type recording medium according to claim 1, wherein the display element layer is a cholesteric liquid crystal display element layer.

9. The photo-writing type recording medium according to claim 1, wherein the display element layer is a cholesteric liquid crystal display element layer.

10. A manufacturing method for manufacturing an a.c. driving system photo-writing type recording medium, the method comprising the steps of:

forming an optical switching layer on an electrode side surface of a substrate on which an electrode is formed;

forming a display element layer on a transparent electrode side surface of a transparent substrate on which a transparent electrode is formed; and laminating an optical switching layer side surface of the substrate and a display element layer side surface of the transparent substrate with each other;

wherein in the optical switching layer forming step, a first charge generation layer having a charge generation material, a charge transport layer having charge transport material, and a second charge generation layer having the charge generation material are layered subsequently; and wherein in the layering step, the charge generation material and the charge transportation material are selected to satisfy the following equation (1):

$$|Ipcgl - Ipctl| \leq 0.5 \text{ eV} \tag{1}$$

where Ipcgl is an ionization potential of the charge generation material; and Ipctl is an ionization potential of the charge transport material.

11. A manufacturing method for manufacturing an a.c. driving system photo-writing type recording medium, the method comprising the steps of:

forming an optical switching layer on a transparent electrode side surface of a transparent substrate on which a transparent electrode is formed;

forming a display element layer on an electrode side surface of a substrate on which an electrode is formed; and laminating an optical switching layer side surface of the substrate and a display element layer side surface of the transparent substrate with each other;

wherein in the optical switching layer forming step, a first charge generation layer having a charge generation material, a charge transport layer having charge transport material, and a second charge generation layer having the charge generation material are layered subsequently; and wherein in the layering step, the charge generation material and the charge transportation material are selected to satisfy the following equation (1):

$$|Ipcgl - Ipcgl| \leq 0.5 \text{ eV} \tag{1}$$

where Ipcgl is an ionization potential of the charge generation material; and Ipctl is an ionization potential of the charge transport material.

* * * * *